No. 655,696. Patented Aug. 14, 1900.
W. B. H. DOWSE.
FASTENER.
(Application filed May 5, 1899.)
(No Model.)
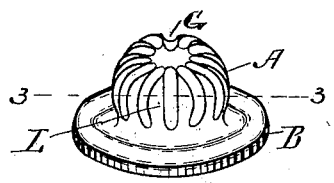
Fig. 1.
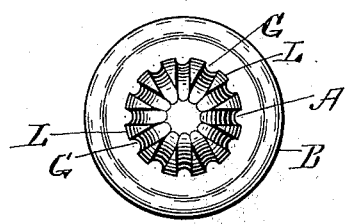   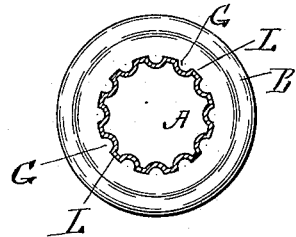
Fig. 2.   Fig. 3.
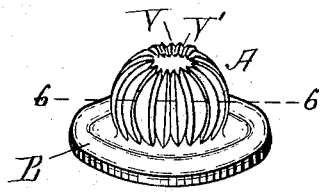
Fig. 4.
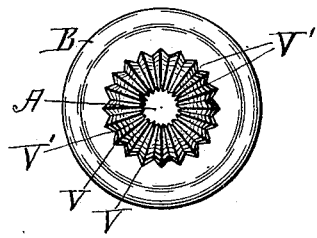   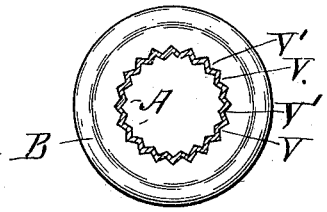
Fig. 5.   Fig. 6.
WITNESSES   INVENTOR

UNITED STATES PATENT OFFICE.

WILLIAM B. H. DOWSE, OF NEWTON, MASSACHUSETTS, ASSIGNOR TO THE CONSOLIDATED FASTENER COMPANY, OF PORTLAND, MAINE.

FASTENER.

SPECIFICATION forming part of Letters Patent No. 655,696, dated August 14, 1900.

Application filed May 5, 1899. Serial No. 715,757. (No model.)

*To all whom it may concern:*

Be it known that I, WILLIAM B. H. DOWSE, of Newton, in the county of Middlesex and State of Massachusetts, have invented a new and useful Improvement in Fasteners, of which the following, taken in connection with the accompanying drawings, is a specification.

This invention consists in an improvement in that class of fasteners for gloves, &c., known as "ball-and-socket" fasteners, and relates to the ball part of the fastener and is comprised in the structure and formation of the said ball member. The object is to cheapen and simplify the construction of the fastener.

The invention is embodied in the devices illustrated in the accompanying drawings, in which—

Figure 1 is a perspective view of one of my improved ball members. Fig. 2 is a plan of the same. Fig. 3 is a horizontal section taken through 3 3 of Fig. 1. Fig. 4 shows in perspective a modification of my device. Fig. 5 is a plan of the modified device. Fig. 6 is a horizontal section taken on line 6 6 of Fig. 4.

In the drawings, Figs. 1, 2, and 3, the ball A and its flange B are represented as made of a single piece of metal, although the ball part may be made separate from the base and the two united by any of the well-known means.

To obtain the necessary elasticity or spring, the surface of the ball is divided by grooves and lands or grooves and ribs extending from the base to top of the ball, so that as the socket part is forced over it in buttoning the ball will yield and then will spring back as soon as the constricted part of the socket has passed the larger diameter.

Instead of obtaining the necessary elasticity by means of lands L and grooves G, as indicated in Figs. 1, 2, and 3, the corrugations may consist of V-shaped grooves V' V' and ribs V V, as shown in Figs. 4, 5, and 6.

The corrugations may be of any design and arrangement as to detail, and instead of running meridianly, as shown in the drawings, they may be more or less inclined, so as to form spiral lines.

I claim—

1. In a ball-and-socket fastener, a ball member having lands and grooves extending from base to top whereby elasticity is secured, substantially as and for the purpose set forth.

2. In a ball-and-socket fastener, a ball member of globular contour formed with ribs and grooves extending vertically from the base to top of the ball, whereby a circumferential elasticity is effected, substantially as and for the purpose specified.

In testimony whereof I have signed my name to this specification, in the presence of two subscribing witnesses, on this 27th day of April, A. D. 1899.

WM. B. H. DOWSE.

Witnesses:
G. W. PHILLIPS,
A. H. FLANNERY.